(12) United States Patent
Silverstein et al.

(10) Patent No.: US 12,722,476 B2
(45) Date of Patent: Sep. 1, 2026

(54) FUEL SPILL PREVENTION DEVICE

(71) Applicant: Arthur Edison LLC, Huntington Station, NY (US)

(72) Inventors: Steven Silverstein, Huntington, NY (US); Howard Silverstein, Great Neck, NY (US)

( * ) Notice: Subject to any disclaimer, the term of this patent is extended or adjusted under 35 U.S.C. 154(b) by 0 days.

(21) Appl. No.: 19/075,663

(22) Filed: Mar. 10, 2025

(65) Prior Publication Data

US 2025/0319763 A1 Oct. 16, 2025

Related U.S. Application Data

(60) Provisional application No. 63/633,655, filed on Apr. 12, 2024.

(51) Int. Cl.
*B60K 15/04* (2006.01)
*B60K 15/03* (2006.01)

(52) U.S. Cl.
CPC .... *B60K 15/04* (2013.01); *B60K 2015/03368* (2013.01); *B60K 2015/048* (2013.01)

(58) Field of Classification Search
CPC .......... B60K 15/04; B60K 2015/03368; B60K 2015/048; B60K 2015/0483; B60K 2015/049
See application file for complete search history.

(56) References Cited

U.S. PATENT DOCUMENTS

| | | | | |
|---|---|---|---|---|
| 1,347,383 A * | 7/1920 | Kendt | B67C 11/04 | 141/345 |
| 3,967,660 A * | 7/1976 | Russell | B67D 7/421 | 141/95 |
| 5,035,272 A * | 7/1991 | Kawase | B60K 15/04 | 285/379 |
| 5,195,567 A * | 3/1993 | Tyree, Jr. | B67C 11/02 | 141/297 |
| 5,277,233 A * | 1/1994 | Fleming | B67C 11/00 | 141/96 |
| 5,865,222 A * | 2/1999 | Diamond | B67D 7/3209 | 141/311 A |
| 5,878,795 A * | 3/1999 | Armellino | B67D 7/421 | 141/86 |
| 5,918,650 A * | 7/1999 | Borden | B65B 3/06 | 141/366 |
| 7,264,027 B2 * | 9/2007 | Rosenbaum | F01M 11/0408 | 141/338 |
| 7,360,565 B2 * | 4/2008 | Peterson | B60K 15/04 | 141/285 |
| 7,874,326 B1 * | 1/2011 | Harvey | B67C 11/00 | 141/330 |
| 8,887,775 B2 * | 11/2014 | Burkholder | B67D 7/365 | 137/433 |
| 10,246,316 B1 * | 4/2019 | Winters | B67C 11/02 | |

(Continued)

*Primary Examiner* — Nicolas A Arnett

(57) ABSTRACT

A fuel spill prevention device is disclosed that comprises a body section defined by a first end and a second end. The body section is hollow throughout and has a first opening disposed at the first end and a second opening disposed at the second end. Both the first and second openings are in communication with an interior of the body section. The body section is further comprised of at least a first subsection and a second subsection, wherein the first subsection has a diameter that is larger than a diameter of the second subsection.

13 Claims, 7 Drawing Sheets

(56) References Cited

U.S. PATENT DOCUMENTS

| | | | | |
|---|---|---|---|---|
| 2004/0201217 | A1* | 10/2004 | Mobley | F16L 11/127<br>285/417 |
| 2004/0261902 | A1* | 12/2004 | Eddins | F41B 9/0071<br>222/79 |
| 2008/0173374 | A1* | 7/2008 | Burstein | B67C 11/02<br>141/331 |

* cited by examiner 10
40
42
38

10
40

10
42
14
40
44
46

10
42
40
46

FUEL SPILL PREVENTION DEVICE

CROSS-REFERENCE TO RELATED APPLICATION

This application claims priority to U.S. Provisional Application No. 63/633,655, filed Apr. 12, 2024, the disclosure of which is incorporated herein by reference in its entirety.

TECHNICAL FIELD

The disclosure relates generally to a fuel spill prevention device that may be used while fueling a motorized vehicle, such as a boat, and in particular, to a fuel spill prevention device to facilitate a fueling operation where the fueling apertures for the vehicle is significantly larger than the standard fueling nozzles.

BACKGROUND

In certain vehicles, such as, for example, boats, the fueling aperture is designed to be much larger than an outer diameter of standard fueling nozzles. For example, in the United States the fueling nozzles are of two standard varieties, 15/16 of an inch used for diesel fueling and 13/16 of an inch used for gasoline. However, standard apertures of fuel intakes are significantly larger. For example, fuel intakes may have a 1.5", 1.75" and 2" sized openings on boats that are over 14 feet in length.

Due to the significant size difference between the fueling aperture and the fueling nozzle, this creates an issue in that it is very difficult to control the flow of fuel into a fuel intake without having at least some portion of the fuel to overflow during the process. Notably, unlike fueling an automobile or truck, an auto-shutoff feature of the fuel nozzles will not work due to the large opening in the boats. This can lead to a serious ecological concern for all our navigable waterways; one for which for which there has been no real usable solution. In addition, the flow of fuel, which is carcinogenic, may overflow onto the person filling the vessel and/or the vessel itself. In this situation, the vessel may become damaged and/or a slipping hazard may be caused.

SUMMARY

In one exemplary arrangement, a fuel spill prevention device is disclosed that comprises a body section defined by a first end and a second end. The body section is hollow throughout and has a first opening disposed at the first end and a second opening disposed at the second end. Both the first and second openings are in communication with an interior of the body section. The body section is further comprised of at least a first subsection and a second subsection, wherein the first subsection has a diameter that is larger than a diameter of the second subsection.

In a further exemplary arrangement, the first opening is defined by a first diameter and the second opening is defined by a second diameter that is smaller than the first diameter. A flange element may be disposed about the first end, the flange element extending radially outwardly from the first end.

In a further exemplary arrangement, there may be a third body subsection, wherein a diameter of the third body subsection is smaller than the diameter of the second body subsection. Each of the body subsections may further comprise a thread disposed on an outer circumferential surface thereof to engage with an interior element of a fuel intake to frictionally retain the fuel spill prevention device within the fuel intake. The sizes of the first, second and third subsections correspond to the standard sizes of fuel intakes for boats and the threads correspond to the same threading used on interior of boat vessels which use screw on fuel caps.

The fuel spill prevention device may be constructed of a gas resistant rubber material, such as a thermoplastic elastomer. An anti-static additive may be incorporated into the thermoplastic elastomer. In one exemplary arrangement, the anti-static additive is approximately 3% of the material composition. In addition, a biodegradable additive may also be included in the material composition. In one exemplary arrangement, the biodegradable additive may comprise 0.5% of the material composition.

In one exemplary arrangement, the fuel spill prevention device may further comprise a funnel-shaped element at the first end. The funnel-shaped element serves to allow for splash of fuel, but direct that splash into the fuel spill prevention device and ultimately into the fuel intake, due to the tapered nature of the funnel-shaped element.

BRIEF DESCRIPTION OF THE DRAWINGS

The foregoing and other features and advantages of the present disclosure will become apparent to those skilled in the art to which the present disclosure relates upon reading the following description with reference to the accompanying drawings, in which.

DETAILED DESCRIPTION

Figure 1:
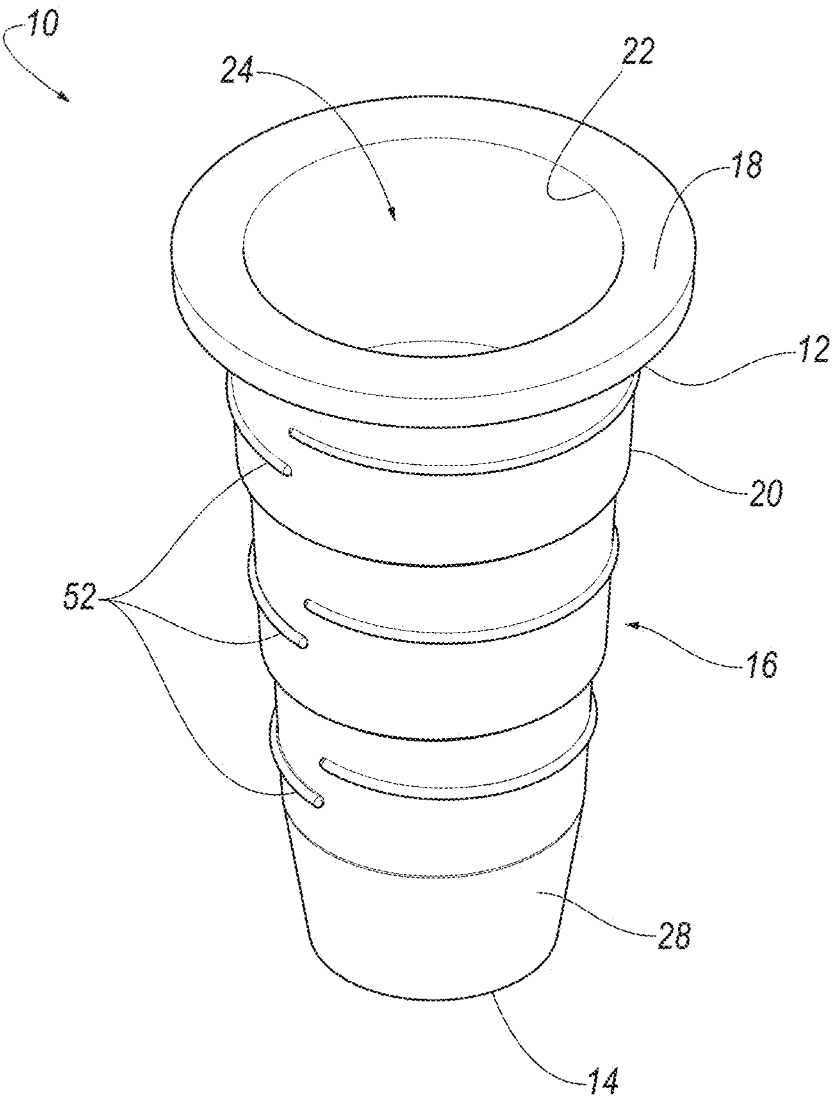
FIG. 1 is a perspective view of a first exemplary arrangement of a fuel spill prevention device.

Referring now to the discussion that follows, and to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Figures 2, 3:
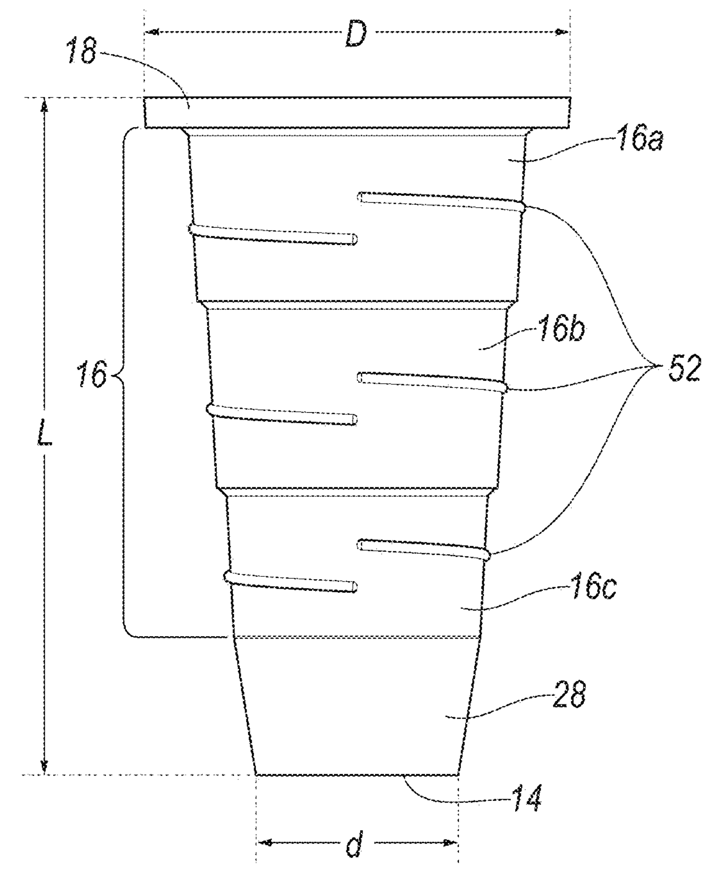
FIG. 2 is a side elevational view of the fuel spill prevention device of FIG. 1.
FIG. 3 is a top plane view of the fuel spill prevention device of FIG. 1.

Referring to FIGS. 1-3, an exemplary arrangement of a fuel spill prevention device 10 is shown. The exemplary fuel spill prevention device 10, is constructed as a one piece device, defined by a first end 12 and a second end 14, with a body section 16 therebetween. The first end 12 has a flange element 18 that extends beyond an outer circumference surface 20 of the body section 16.

The body section 16 is constructed to be hollow through its length. A first opening 22 is defined through the flange element 18 and in communication with a hollow interior 24 of the body section 16. A second opening 26 is defined through the second end 14 and is also in communication with the hollow interior 24. As may be seen in FIG. 3, the first opening 22 is larger than the second opening 26.

In one exemplary arrangement, the flange element 18 is designed to have a sufficient weight to assist with keeping the shape of the fuel spill prevention device 10 while in use. For example, in one exemplary arrangement, the flange element 18 is constructed to be about 0.125" thick and 0.25" wide so that a top portion of the fuel spill prevention device 10 has sufficient rigidity. In addition, the weighted nature of the flange element 18 also allows a user to easily remove the device from the fuel intake, as well as provide a shoulder on which a fueling nozzle 32 may rest during use.

Referring now to FIG. 2, the body section 16 is configured with different sections 16*a*, 16*b*, and 16*c*. In one exemplary arrangement, each section 16*a*, 16*b*, 16*c* represents one of the standard fuel intake sizes from a particular industry. For example, in the boating industry, each section 16*a*, 16*b*, and 16*c* represents the three standard sizes from the boating industry, i.e., 1.5 inches, 1.75 inches and 2 inches. Further, each section 16*a*, 16*b*, 16*c*, are arranged in a successive, graduated manner, with the largest being positioned closer to the flange element 18. In this manner, the fuel spill prevention device 10 is a versatile device that can be used with multiple boats.

Extending from the lowermost section 16*c*, there is a transition section 28. The transition section 28 tapers inwardly from body section 16 to second end 14. The degree of taper for the transition section 28 may be varied depending on the type of fuel the fuel spill prevention device 10 is to be used with. For example, the fuel spill prevention device 10 may be used with diesel, regular gasoline, and high-volume diesel. Thus, the degree of taper and the size of the second opening 26 may be varied to allow a predetermined amount of air to pass between the fuel spill prevention device 10 and an outer surface 30 of a fuel nozzle 32 (seen best in FIG. 9). More specifically, the predetermined amount of air is defined by a clearance 34 between an inner surface 36 of the transition section 28, and the outer surface 30 of the fuel nozzle 32. For example, in one exemplary arrangement, the target clearance is approximately 0.020". However, to avoid interference with normal operation of the auto-shut off of the fueling nozzle 32, a variance of 0.00" to 0.005" of the clearance is recommended.

The fuel spill prevention device 10 is constructed of a gas resistant rubber material that is also treated so as to eliminate static charge buildup, which commonly occur during fueling operations. In one exemplary arrangement, the fuel spill prevention device 10 is constructed of a thermoplastic elastomer, such as, for example, styrene-ethylene-butylene-styrene (SEBS), with an anti-static additive. In one exemplary arrangement, the durometer of the material for the fuel protection device 10 shall be in the range of 80-85 durometer. More specifically, the material for the fuel protection device 10 should be sufficiently rigid to allow the fuel protection device 10 to provide structural integrity to the fuel protection device 10, but also allow some flex within the device 10, while in use.

In one exemplary arrangement, the anti-static additive may comprise approximately 3% of the material composition for the fuel spill prevention device 10. When the fuel protection device 10 is inserted within a fuel tank opening 38, and the fuel nozzle 32 is inserted into the fuel spill prevention device 10, the fuel nozzle 32 becomes grounded to the fuel tank opening 38. By this action, the danger of static electricity and sparks are minimized.

Further, the use of SEBS material allow for efficient manufacture of the fuel spill prevention device 10, such as, for example, injection molding. In addition to the use of an anti-static additive, a biodegradable additive may also be included in the material of the fuel spill prevention device 10 so as to be environmentally friendly. In one exemplary arrangement, the biodegradable additive may comprise approximately 0.5% of the material composition for the fuel spill prevention device 10. It is also contemplated that additional additives may added to improve the functionality of the fuel spill prevention device 10.

Referring to FIGS. 4A-9, use of the fuel spill prevention device 10 will now be explained in greater detail. As may be seen, a boat deck 40 includes a fuel tank opening 38. Typically, the fuel tank opening 38 further includes an outer flange element 42. The fuel tank opening 38 is in communication with an intake channel 44. Connected to the intake channel 44 is a fuel conduit 46. The fuel conduit 46 is disposed over a portion of the intake channel 44 and operatively connected to the intake channel 44, such as by a threaded connection. The fuel conduit 46 is operatively connected to a fuel tank, not shown. As may be seen best in FIG. 8, the intake channel 44 has an inward taper 48, such that a diameter of the intake channel 44 closer to the boat deck 40 is larger than an end portion 50 (best seen in FIG. 9) of the intake channel 44.

Figures 4A, 4B, 5A, 5B:
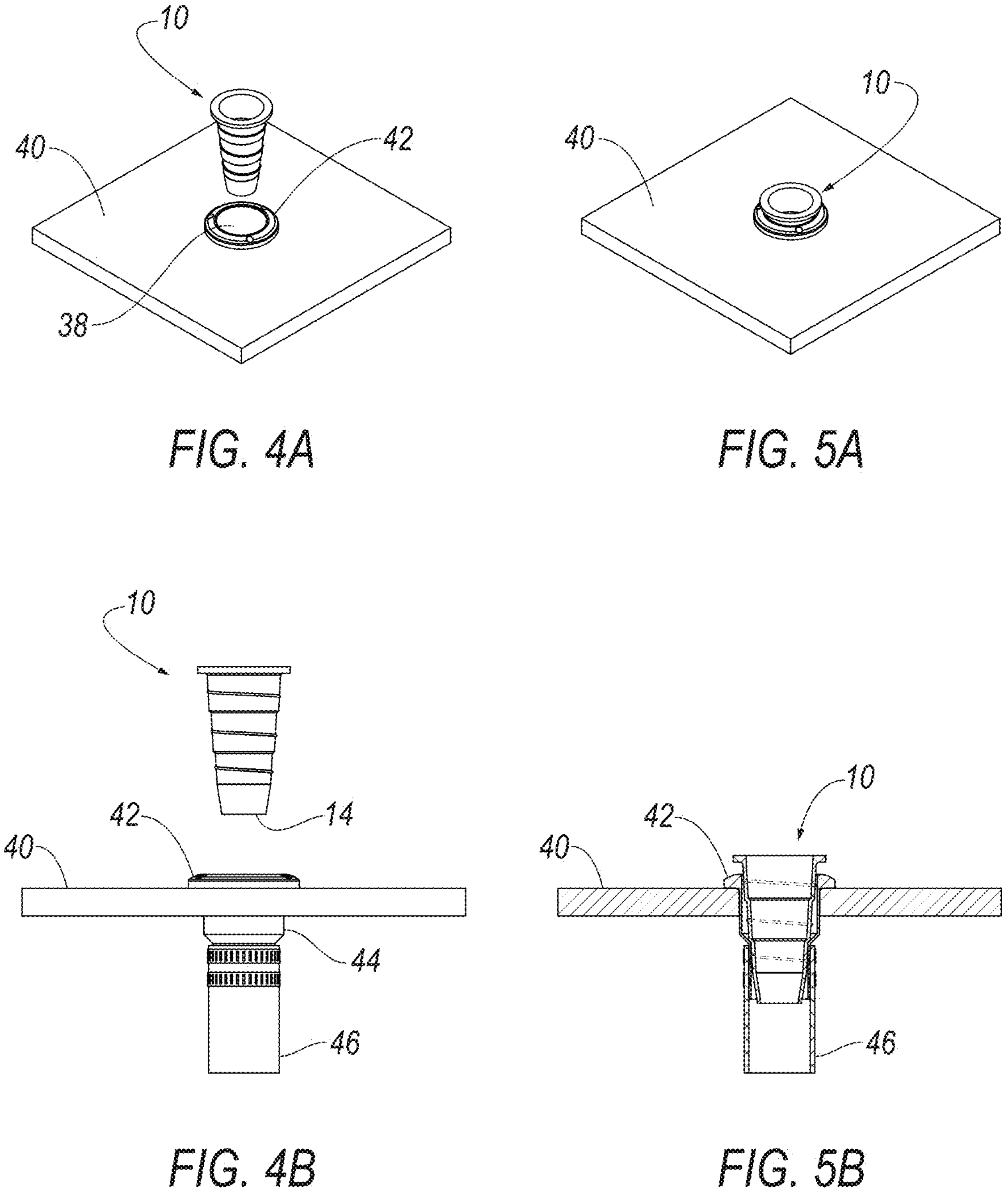
FIGS. 4A and 4B illustrate an insertion operation of the fuel spill prevention device of FIG. 1 into a fuel intake of a vehicle.
FIGS. 5A and 5B illustrate the fuel spill prevention device of FIG. 1 after it is fully seated within the fuel intake.

As may be seen in FIGS. 4A-4B, the fuel spill prevention device 10 is inserted into the fuel tank opening 38, with the second end 14 being inserted first into the fuel tank opening 38. In one exemplary arrangement, the outer circumference surface 20 of the body section 16 of the fuel spill prevention device 10 may include threads 52. In one exemplary arrangement, at least one thread is provided on each section 16*a*, 16*b*, and 16*c* of the body section 16 (best seen in FIGS. 1 and 2). The threads 52 may be disposed generally in a center of each section 16*a*, 16*b*, and 16*c*. The threads 52 correspond to the same threading commonly used on the interior of fuel intakes in vessels which use screw on fuel caps.

When inserting the fuel spill prevention device 10 into the fuel tank opening 38, as the fuel spill prevention device 10 is advanced, the threads 52 of the respective sections 16*a*, 16*b*, 16*c* are moved past the inward taper 48 until the appropriate sized section 16*a*, 16*b*, 16*c* is mated with the corresponding sized inward taper 48. For example, in the example shown in FIG. 8, section 16*b* corresponds with the diameter of the inward taper 48, i.e., the second industry size of 1.75" for the intake channel 44. To insure that the fuel spill prevention device 10 does not unintentionally come out of the intake channel 44 during fueling, as well as to hold the weight of the fuel nozzle 32, the threads 52, which are designed to be slightly larger than the inward taper 48, compress as the threads 52 move past the inward taper 48, and engage with the corresponding threads, but then snap back to their original shape on the outer circumference surface 20. In this way, the fuel spill prevention device 10 becomes frictionally retained within the intake channel 44, as shown in FIGS. 5A-5B. For vessels without the internal threading, the fuel spill prevention device 10 will still act like a wedge to assist with the seating and stability of the fuel spill prevention device 10 when in place.

Figures 8, 9:
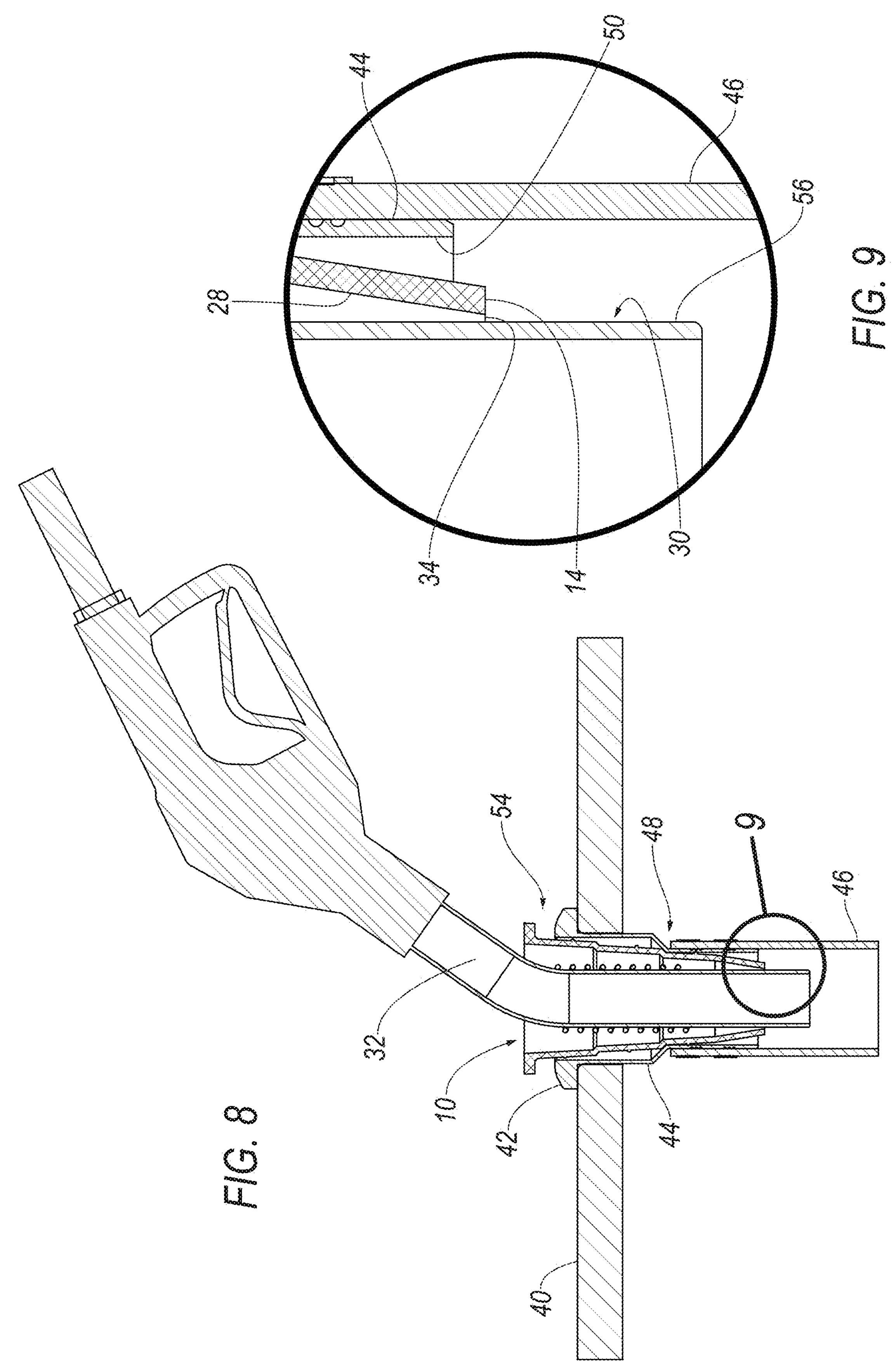
FIG. 8 is an enlarged view of FIG. 7B.
FIG. 9 is an enlarged view of area 9 from FIG. 8, illustrating the relationship between an end of the fuel spill prevention device and a fueling nozzle inserted therein.

As may be seen best in FIG. 9, once seated, the flange element 18 of the fuel spill prevention device 10 and the flange element 42 of the intake channel 44 are spaced from one another. With this arrangement, a gripping channel 54 is formed that enables a user to easily grasp the flange element 18 of the fuel spill prevention device 10 to extract the fuel spill prevention device 10 from the intake channel 44, when desired.

Figures 6A, 6B, 7A, 7B:
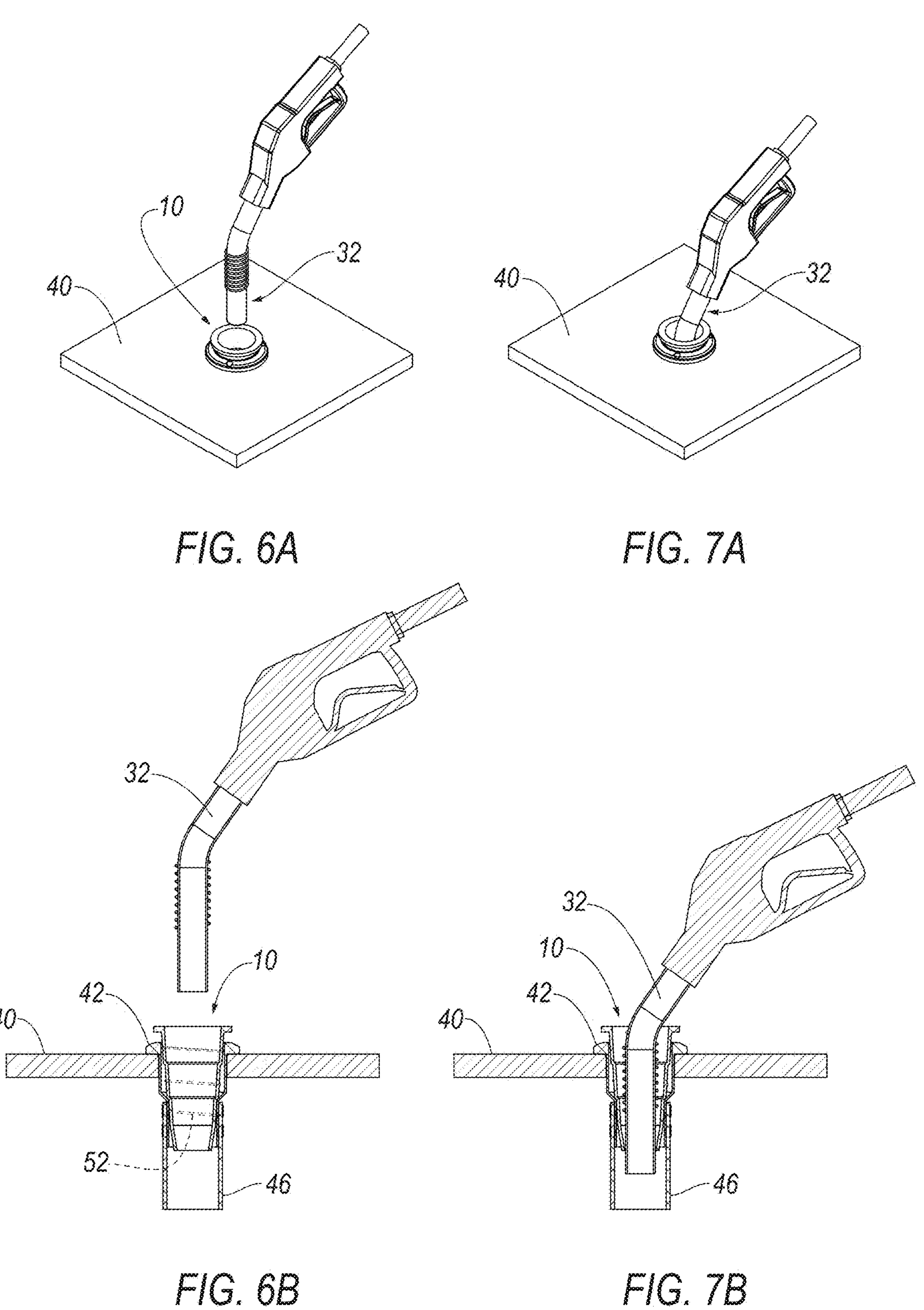
FIGS. 6A and 6B illustrate an insertion operation of a fueling nozzle into the fuel spill prevention device of FIG. 1.
FIGS. 7A and 7B illustrate the fueling nozzle after it is fully seated within the fuel spill prevention device of FIG. 1.

Once the fuel spill prevention device 10 is seated within the fuel tank opening 38, the fuel nozzle 32 is then directed into the fuel spill prevention device 10, until it is fully inserted, as shown in FIGS. 7A and 7B. Spillage is prevented, once the device 10 is inserted. Once inserted, referring to FIG. 9, as discussed above, a clearance 34 is formed between the second end 14 of the fuel spill prevention device 10 and an end 56 of the fuel nozzle 32. This clearance 34 allows for the automatic fuel shut-off to operate. More specifically, the fuel spill prevention device 10 traps the fuel in an area of a fill tube of the fuel nozzle 32. In this manner, the fuel covers the end of the fuel nozzle 32, which causes a venturi valve within the fuel nozzle handle to open to stop the flow of fuel. Once seated, as shown in FIG. 8, for example, a fueling operation may commence. After fueling is completed, the fuel nozzle 32 may be extracted from the fuel spill prevention device 10. Once removed, the fuel spill prevention device 10 may then be removed from the fuel tank opening 38.

Figure 10:
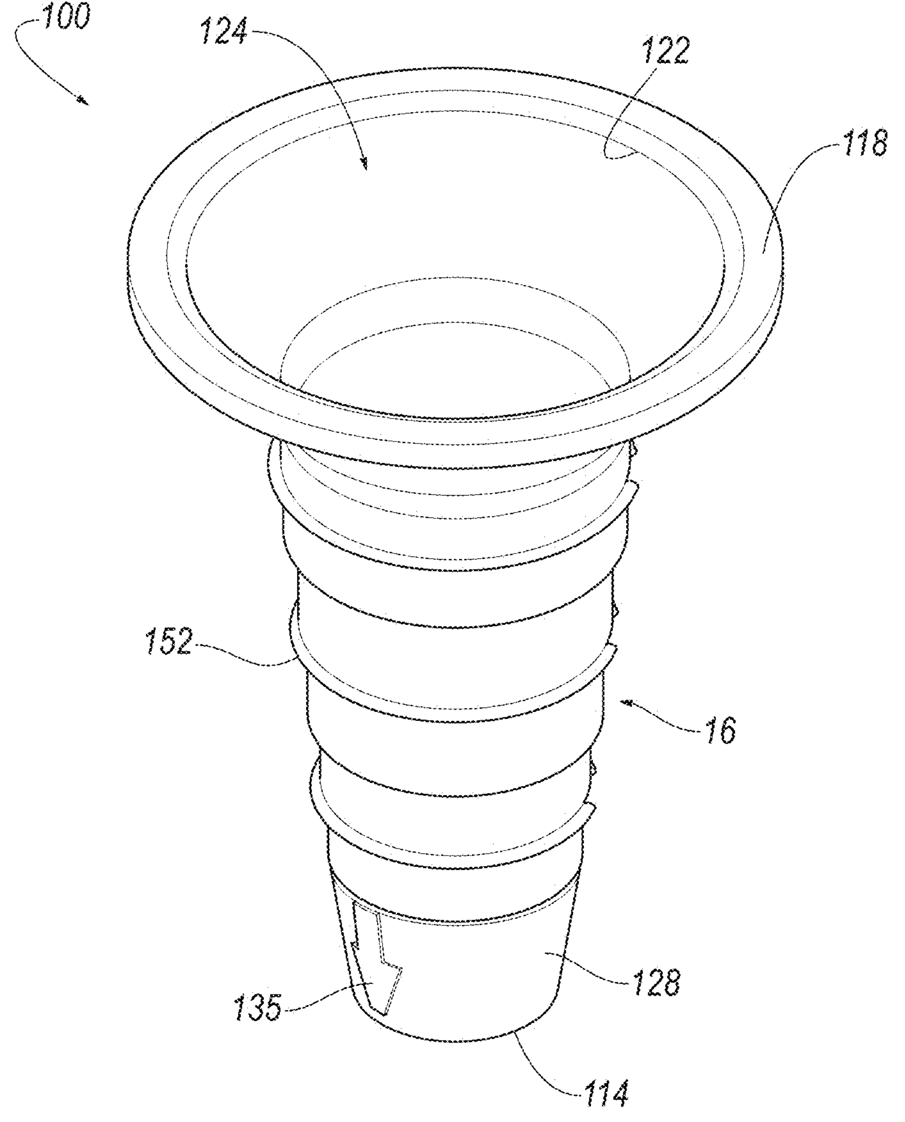
FIG. 10 is a perspective view of an alternative exemplary arrangement of a fuel spill prevention device.
Figure 11:
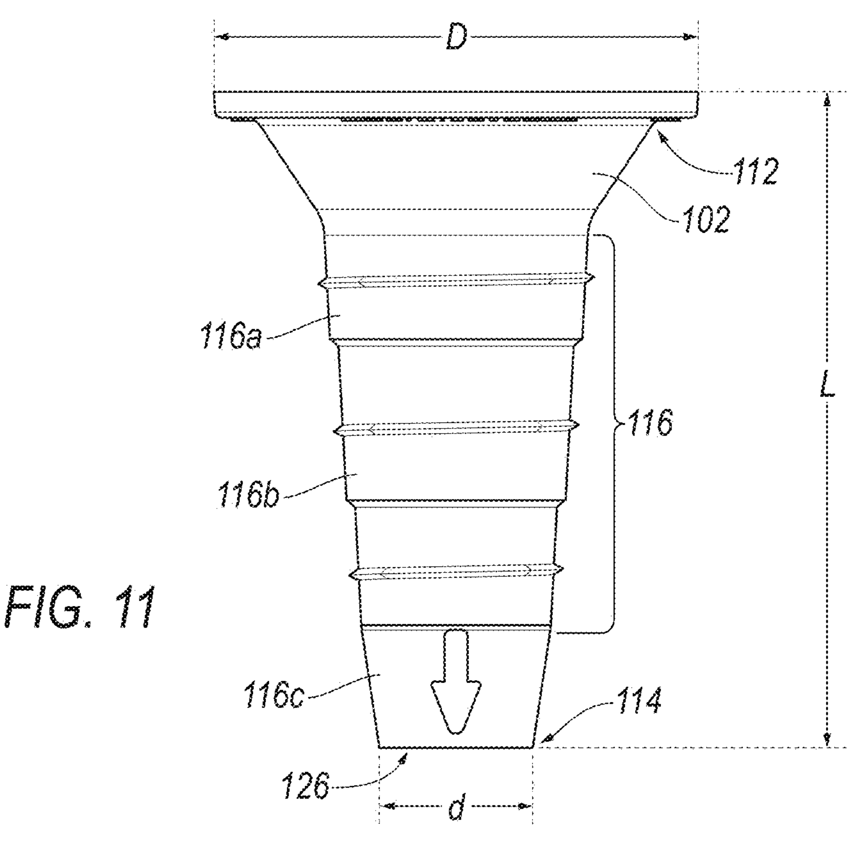
FIG. 11 is a side elevational view of the fuel spill prevention device of FIG. 10.
Figure 12:
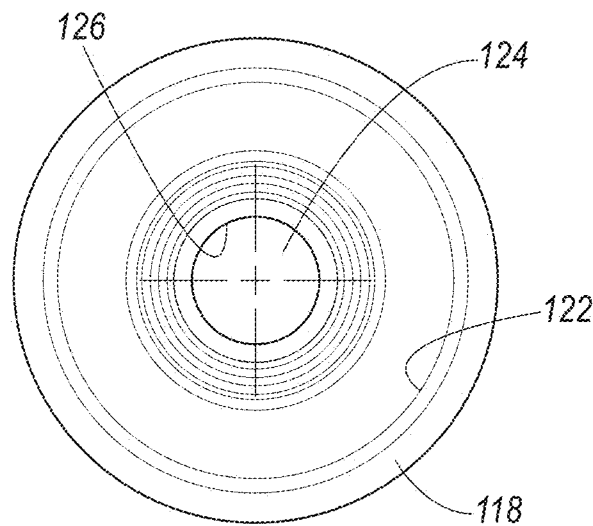
FIG. 12 is a top plan view of the fuel spill prevention device of FIG. 10.

An alternative exemplary arrangement of a fuel spill prevention device 100 is shown in FIGS. 10-12. Similar to the fuel spill prevention device 10, fuel spill prevention device 100 may constructed as a one piece device, and is also defined by a first end 112 and a second end 14, with a body section 116 therebetween. However, the first end 112 is defined as funnel-shaped element 102 that tapers inwardly toward the body section 116. The first end 112 has a flange element 118 that extends beyond an outer circumference surface 120 of the body section 116.

The body section 116 is constructed to be hollow through its length L. A first opening 122 is defined through the flange element 118 and in communication with a hollow interior 124 of the body section 116. A second opening 126 is defined through the second end 114 and is also in communication with the hollow interior 124. As may be seen in FIG. 12, the first opening 122 has a diameter D that is larger than a diameter d of the second opening 126.

In one exemplary arrangements, the flange element 118 is designed to have a sufficient weight to assist with keeping the shape of the fuel spill prevention device 100 while in use. More specifically, in one exemplary arrangement, the flange is constructed to be approximately 0.125" thick and 0.25" wide to provide a sufficient rigidity. In addition, the weighted nature of the flange element 118 also allows a user to easily remove the device from the intake channel 144, as well as provide a shoulder on which a fueling nozzle 132 may rest during use.

Referring to FIG. 11, the body section 116 is configured with different sections 116*a*, 116*b*, and 116*c*. In one exemplary arrangement, each section 116*a*, 116*b*, 116*c* represents one of the standard fuel intake sizes from a particular industry, such as for example, the boating industry, as outlined above. Each section 116*a*, 116*b*, 116*c*, are arranged in a successive, graduated manner, with the largest being positioned closer to the flange element 118. In this manner, the fuel spill prevention device 100 is a versatile device that can be used with multiple boats.

Extending from the lowermost section 116*c*, there is a transition section 128. The transition section 128 tapers inwardly from body section 116 to second end 114. The degree of taper for the transition section 128 may be varied depending on the type of fuel the fuel spill prevention device 100 is to be used with. For example, the fuel spill prevention device 100 may be used with diesel, regular gasoline, and high-volume diesel. Thus, the degree of taper and the size of the second opening 126 may be varied to allow a predetermined amount of air to pass between the fuel spill prevention device 100 and an outer surface of a fuel nozzle 32 (as discussed above).

In one exemplary arrangement, an indicator 135 may be formed on a portion of the fuel spill prevention device 100 to provide a visual cue to direct a user on the proper direction for insertion of the fuel spill prevention device 100. In one exemplary arrangement, the indicator 135 may be formed on the transition section 128 and may be formed during an injection molding operation. Alternatively, the indicator 135 may be printed, painted or otherwise placed on the fuel spill prevention device 100.

Similar to the arrangement shown above, the outer circumference surface 120 of fuel spill prevention device 100 may also have threads 152 disposed on the body section 116 to frictionally secure the fuel spill prevention device 100 within an intake channel, as described above.

Like the exemplary arrangement described above, the fuel spill prevention device may be constructed of SEBS material, with the anti-static material additive and/or a biodegradable additive.

What have been described above are examples of the present disclosure. It is, of course, not possible to describe every conceivable combination of components or methodologies for purposes of describing the present invention, but one of ordinary skill in the art will recognize that many further combinations and permutations of the present invention are possible. While certain novel features of this disclosure shown and described below are pointed out in the annexed claims, the disclosure is not intended to be limited to the details specified, since a person of ordinary skill in the relevant art will understand that various omissions, modifications, substitutions and changes in the forms and details of the disclosure illustrated and in its operation may be made without departing in any way from the spirit of the present disclosure. Accordingly, the present disclosure is intended to embrace all such alterations, modifications, and variations that fall within the scope of the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. No feature of the disclosure is critical or essential unless it is expressly stated as being "critical" or "essential."

What is claimed is:

1. A fuel spill prevention device, comprising:

a body section defined by a first end and a second end, wherein the body section is hollow throughout and having a first opening disposed at the first end and a second opening disposed at the second end, both the first and second opening being in communication with an interior of the body section;

wherein the body section is further comprised of at least a first subsection and a second subsection, wherein the first subsection has a diameter that is larger than a diameter of the second subsection;

wherein the fuel spill prevention device is constructed of a gas resistant rubber material; and wherein the gas resistant rubber material further includes a biodegradable additive.

2. The fuel spill prevention device of claim 1, further comprising a transition section disposed between the body section and the second opening, wherein the transition section tapers inwardly from the body section to the second opening.

3. The fuel spill prevention device of claim 1, wherein the first opening is defined by a first diameter and the second opening is defined by a second diameter that is smaller than the first diameter.

4. The fuel spill prevention device of claim 1, further comprising a flange element disposed about the first end, the flange element extending radially outwardly from the first end.

5. The fuel spill prevention device of claim 1, wherein each of the body subsections further comprise a thread disposed on an outer circumferential surface.

6. The fuel spill prevention device of claim 1, wherein the gas resistant rubber material further includes an anti-static additive.

7. The fuel spill prevention device of claim 6, wherein the anti-static additive comprises approximately 3% of the material composition for the fuel spill prevention device.

8. The fuel spill prevention device of claim 1, wherein the biodegradable additive comprises approximately 0.5% of the material composition for the fuel spill prevention device.

9. The fuel spill prevention device of claim 1, wherein the gas resistant rubber material is a thermoplastic elastomer.

10. The fuel spill prevention device of claim 1, wherein the body section is made up of an additional third subsection, wherein each subsection corresponds to a standard size of a fuel intake in boats.

11. The fuel spill prevention device of claim 10, wherein each of the first, second and third subsections are arranged in a successive, graduated manner.

12. The fuel spill prevention device of claim 1, wherein the first end is constructed as a funnel-shaped element that tapers inwardly toward the body section.

13. The fuel spill prevention device of claim 12, wherein a flange element is disposed on the funnel-shaped element.

* * * * *